United States Patent [19]

Gejl-Hansen

[11] Patent Number: 4,510,163

[45] Date of Patent: Apr. 9, 1985

[54] PROCESS FOR PREPARING A REHYDRATABLE DICED FROZEN FOOD PRODUCT

[75] Inventor: Frederik Gejl-Hansen, Aarhus, Denmark

[73] Assignee: Nestec S.A., Vevey, Switzerland

[21] Appl. No.: 396,836

[22] Filed: Jul. 9, 1982

[30] Foreign Application Priority Data

Aug. 28, 1981 [EP] European Pat. Off. ........ 81106716.4

[51] Int. Cl.³ .......................... A23L 3/16; A23B 4/06; A23K 1/18
[52] U.S. Cl. .................................. 426/241; 426/524; 426/805
[58] Field of Search ............... 426/241, 242, 243, 245, 426/249, 514, 518, 805, 524, 557, 513; 219/10.55 M

[56] References Cited

U.S. PATENT DOCUMENTS

| | | | |
|---|---|---|---|
| 3,421,434 | 1/1969 | Krachmer | 426/513 |
| 3,479,188 | 11/1969 | Thelen | 426/241 |
| 3,520,701 | 7/1970 | Rendek et al. | 426/242 |
| 4,208,439 | 6/1980 | Hsu | 426/242 |
| 4,342,788 | 8/1982 | Clatfelter | 426/243 |

FOREIGN PATENT DOCUMENTS 46-28130  8/1971  Japan ................................. 426/557

*Primary Examiner*—George Yeung
*Attorney, Agent, or Firm*—Vogt and O'Donnell

[57] ABSTRACT

A process for preparing a diced frozen food product characterized in that a compact solid foodstuff is treated with microwaves to remove some of the water present, the foodstuff being diced before or after the microwave treatment, and finally frozen.

6 Claims, No Drawings

PROCESS FOR PREPARING A REHYDRATABLE DICED FROZEN FOOD PRODUCT

The present invention relates to the preparation of a food product, more particularly to a process for the preparation of a partially dehydrated frozen food product which can be readily thawed and rehydrated for consumption by the addition of hot water.

Partially dehydrated frozen food products have been described which can be made ready for consumption simply by thawing and rehydrating by the addition of hot water. One described method of making these products comprises cooking and pressing the foodstuff to remove some of the water and then freezing. However, when the food product consists of individual dice there are problems with the texture which lead not only to the disintegration of the dice immediately upon thawing but also to incomplete rehydration. We have found, surprisingly, that diced frozen food products with the desired texture and rehydrating properties may be obtained by a process which includes a microwave treatment followed by a freezing.

By "diced" food products in this specification we mean food products in the form of chunks or pellets having the shapes of, for example, dice, rings, rods, balls, stars or bananas.

Accordingly, the present invention provides a process for preparing a diced frozen food product characterized in that a compact solid foodstuff is treated with microwaves to remove some of the water present, the foodstuff being diced before or after the microwave treatment, and finally frozen.

When the foodstuff which is to be treated with microwaves consists of a mixture of nutritive ingredients, a mixing process is carried out to bind the ingredients together to form the compact solid mass. This mixing may be carried out, for example, in a commercially available mixer, such as a "Hobart" mixer or, when dealing with larger quantities, a "Wolfking" twin mixer. The duration of the mixing operation is not critical and may be, for example, about 5 minutes for a 50 kg batch.

Before the microwave treatment, the foodstuff is preferably pressed into long pieces, such as slabs, conveniently by extrusion. When the foodstuff consists of a mixture of nutritive ingredients, the pressing into long pieces forces the ingredients into good intimate contact with each other.

Preferably the pieces have a thickness of from 5 to 20 mm and especially from 7 to 15 mm. The width of the pieces is preferably from 50 to 100 mm to allow more efficient dicing. A "Handtmann" extruder may conveniently be used in the process of this invention.

After extrusion the long pieces may be subjected to the microwave treatment immediately and then diced, or they may be diced first and the resulting dice subjected to the microwave treatment.

During the microwave treatment the amount of water removed from the foodstuff is preferably from 15 to 25% and especially from 17 to 21% by weight based on the total weight of the food material. The temperature at the centre of the foodstuff rises during the microwave treatment preferably to at least 75° C. and especially from 90° C. to 100° C. The duration of the microwave treatment required to obtain the desired loss of water varies inversely with the temperature, and the loss of water can easily be controlled by adjusting the power and the duration of the treatment.

A treatment of from 5 to 15 minutes duration is usually sufficient but shorter or longer treatments may be used. However, longer treatments are usually uneconomical.

The power used may vary from 1 kW to 100 kW, preferably from 10 kW to 50 kW while the frequency may be within the range of from 800 MHz to 3000 MHz and preferably from 2400 MHz to 2500 MHz. Any commercially available microwave unit may be used, a convenient one for the present invention being the "Scan-Pro" microwave tunnel preferably operating at a power of 10 kW and a frequency of 2450 MHz. The microwave treatment heats the foodstuff substantially uniformly and the escaping moisture introduces a porosity therein which aids subsequent rehydration of the frozen product. The heat treatment also coagulates proteins, promotes binding and reduces microbial contamination.

The dicing may be carried out using an ordinary two-dimensional slicer for example an "Urschel" slicer. Preferably the dice have a volume of at least 500 mm$^3$ and especially from 600 to 1'500 mm$^3$ for a pet food.

If the foodstuff is diced before the microwave treatment, it may be diced at ambient temperature, but it may, if desired, be precooled to substantially 0° C. or below, preferably from 0° C. to $-1$° C. in order to allow a more efficient cutting operation and to render the dice easier to handle. After the microwave treatment the diced foodstuff may, if desired, be frozen directly.

If the foodstuff is diced after the microwave treatment, it is preferably subjected to a tempering step below 0° C. to achieve substantial equillibration of the temperature throughout, before being diced. The temperature of the foodstuff may be substantially equilibrated by the tempering process to from $-1$° C. to $-8$° C., preferably from $-3$° C. to $-7$° C. and especially from $-5$° C. to $-6$° C. The tempering step may be carried out by direct equilibration at the appropriate temperature for example, in a tempering cabinet. However, if the tempering step is in-line, it is preferably carried out by crust freezing at temperatures below the equilibration temperature desired, for example, from $-40$° C. to $-90$° C. using materials such as carbon dioxide or liquid nitrogen followed by equilibration to the desired temperature, for instance in an equlibration tunnel. Advantageously, carbon dioxide snow at a temperature from $-45$° C. to $-79$° C. may be used for the crust-freezing. The duration of the crust-freezing is conveniently from 3 to 10 minutes and preferably from 5 to 7 minutes.

The diced product may then be packed into containers followed by freeze storage. It has a long shelf life.

The frozen product may be rehydrated by adding hot water, conveniently boiling water, to produce a foodstuff which is ready to eat. The time for rehydration may be five minutes or less on the addition of an amount of water approximately equal in volume to the partially dehydrated food product. The rehydrated food product has an acceptable flavour and texture.

The process of the present invention is particularly suitable for preparing pet foods especially those suitable for cats and dogs, for instance, those based on the recommended nutrient requirements published by the National Academy of Sciences/National Research Council U.S.A.

The following Examples further illustrate the present invention in which percentages are expressed by weight.

EXAMPLE 1

50 kg of a dog food was prepared from the following ingredients:
- Beef trimmings: 11.50%
- Textured soy: 14.38%
- Soy fibre: 2.83%
- Oat bran: 1.87%
- Rice: 8.30%
- Starch: 10.00%
- Potato flakes: 4.60%
- Blood protein powder: 0.56%
- Mineral+vitamins: 2.81%
- Garlic flavour: 0.20%
- Oxtail flavour: 0.40%
- Water: 42.55%

The above ingredients were mixed in the following specific sequence. The blood protein powder was dissolved and the soy fibres unfolded in most of the water. Then the beef trimmings and flavour solutions were added, followed by solutions of minerals and vitamins. Freshly cooked rice was added warm and finally the dry ingredients were added i.e. starch, potato flakes, bran and textured soy protein. The composition was mixed for 5 minutes to produce a relatively hard mass. This mass was then forced through a "Handtmann" extruder to force the ingredients into good contact with each other and form the mass into long slabs 10 mm thick and 70 mm wide.

The slabs were introduced directly into a "Scan-Pro" 10 kW microwave tunnel operating at 2450 MHz. Water escaped from the food fairly evenly during the cooking process which lasted for 10 minutes by which time the loss of water was 20% and the escaping moisture had imparted a porosity to the slabs.

The temperature at the center of the slabs was 100° C. at the end of the microwave treatment.

After the microwave treatment, the slabs were crust-frozen with carbon dioxide snow at −50° C. for 5 minutes in a freeze tunnel. Afterwards, the temperature of the slabs was equilibrated to −55° C. in an equilibrating tunnel.

Finally the slabs were diced at −5.5° C. using an ordinary "Urschel" two-dimensional slicer to give dice of size 12×12×10 mm which were subsequently frozen. On adding an equal volume of boiling water the product had thawed and rehydrated within 5 minutes, this rapid rehydration being mainly due to the porosity of the slabs. The foodstuff was highly acceptable to dogs.

EXAMPLE 2

50 kg of a cat food was prepared from the following ingredients:
- Cod mince: 15.75%
- Lard+Vegetable oil: 3.78%
- Textured soy: 12.60%
- Soy fibre: 3.15%
- Oat bran: 1.26%
- Rice: 9.45%
- Starch: 10.08%
- Potato flakes: 3.78%
- Krill powder (protein): 1.89%
- Mineral+vitamins: 1.26%
- Flavour (garlic): 0.25%
- Water: 36.75%

The above ingredients were treated in a similar way to the ingredients of Example 1 except that the Krill powder was used instead of the blood protein and the cod mince and the lard+vegetable oil were used instead of the beef trimmings. During the microwave treatment the escaping moisture imparted a porosity to the slabs.

After the tempering step, the slabs were cut into dice of size 8×8×10 mm which were subsequently frozen. On adding an equal volume of boiling water the product had thawed and rehydrated within 5 minutes, this rapid rehydration being mainly due to the porosity of the slabs. The foodstuff was highly acceptable to cats.

COMPARATIVE EXAMPLE A

By carrying out a similar process to that described in Example 1 but heating in an air convection oven instead of treating with microwaves, the diced frozen product crumbled up on the addition of boiling water and did not rehydrate as quickly as that prepared by the process described in Example 1.

COMPARATIVE EXAMPLE B

By carrying out a similar process to that described in Example 2, but heating in an Infrared oven instead of treating with microwaves the diced frozen product crumbled up on the addition of boiling water and did not rehydrate as quickly as that prepared by the process described in Example 2.

I claim:

1. A process for preparing a readily rehydratable diced frozen food product which upon rehydration is ready to eat and is resistant to crumbling comprising binding a mixture of food ingredients to form a compact solid foodstuff, treating the foodstuff with microwaves to remove water present in the foodstuff in an amount of from 15 to 25% by weight based on the total weight of the foodstuff, dicing the foodstuff before or after the microwave treatment, and then freezing the diced, microwave treated foodstuff.

2. A process according to claim 1, wherein before the microwave treatment the foodstuff is extruded to form long slabs.

3. A process according to claim 1 or claim 2, wherein the amount of water removed from the foodstuff during the microwave treatment is from 17% to 21% by weight based on the total weight of the foodstuff.

4. A process according to claim 1, wherein the foodstuff is diced before the microwave treatment at ambient temperature.

5. A process according to claim 1, wherein the foodstuff is diced after the microwave treatment and that before dicing the temperature is substantially equilibrated throughout the foodstuff to from −3° C. to −7° c. by a tempering step.

6. A diced frozen food product prepared by a process according to claim 1.

* * * * *

UNITED STATES PATENT AND TRADEMARK OFFICE
CERTIFICATE OF CORRECTION

PATENT NO. : 4,510,163
DATED : April 9, 1985
INVENTOR(S) : Frederik Gejl-Hansen

It is certified that error appears in the above—identified patent and that said Letters Patent is hereby corrected as shown below:

Column 1, Line 23, "by a freezing" should read --by freezing--.

Column 3, line 42, "-55°C" should read ---5.5°C--.

Column 4, line 3, "Mineral" should read --Minerals--.

Signed and Sealed this

Twenty-third Day of July 1985

[SEAL]

Attest:

DONALD J. QUIGG

Attesting Officer  Acting Commissioner of Patents and Trademarks